United States Patent
Imai et al.

(10) Patent No.: US 7,350,302 B2
(45) Date of Patent: Apr. 1, 2008

(54) JIGSAW

(75) Inventors: Teruo Imai, Ibaraki (JP); Taiichi Kumasaka, Ibaraki (JP); Hideki Watanabe, Ibaraki (JP); Shinki Otsu, Ibaraki (JP); Yoshiichi Komazaki, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/510,794

(22) Filed: Aug. 28, 2006

(65) Prior Publication Data

US 2007/0050994 A1 Mar. 8, 2007

(51) Int. Cl.
*B27B 19/09* (2006.01)

(52) U.S. Cl. ............................................. 30/393; 74/50

(58) Field of Classification Search ................. 30/392, 30/393, 394; 74/50
See application file for complete search history.

(56) References Cited

U.S. PATENT DOCUMENTS

| | | | | | |
|---|---|---|---|---|---|
| 3,374,814 | A | * | 3/1968 | Kaufmann | ................ 83/758 |
| 4,137,632 | A | * | 2/1979 | Pfanzer | .................. 30/393 |
| 4,238,884 | A | * | 12/1980 | Walton, II | ................ 30/393 |
| 4,262,421 | A | * | 4/1981 | Bergler et al. | ............ 30/393 |
| 4,512,078 | A | * | 4/1985 | Pfanzer | .................. 30/393 |
| 4,628,605 | A | * | 12/1986 | Clowers | .................. 30/393 |
| 2004/0117993 | A1 | | 6/2004 | Armstrong | ............ 30/392 |

FOREIGN PATENT DOCUMENTS

| | | |
|---|---|---|
| CN | 1496772 | 5/2004 |
| EP | 1188505 A3 | 9/2003 |
| EP | 1407847 A3 | 9/2004 |
| GB | 1596408 | 8/1981 |
| GB | 1596409 | 8/1981 |
| JP | 53-117897 | 10/1978 |

* cited by examiner

*Primary Examiner*—Hwei-Siu C. Payer
(74) *Attorney, Agent, or Firm*—Mattingly, Stanger, Malur & Brundidge, P.C.

(57) ABSTRACT

An outer peripheral surface of a cam has an apex disposed of distance from a rotational axis, a first region adjacent the apex opposite to the direction of rotation that increases in distance from the rotational axis during rotation, and a second region adjacent the apex in the rotational direction that decreases in distance from the rotational axis of the cam with the rotation thereof. The apex is disposed where the phase θ thereof advances by 15 degrees and 55 degrees or less in the rotational direction from a position symmetrical to the rotational axis. The rate of change between the second region and the rotational axis is greater than the rate of change between the first region and the rotational axis. A retreat amount X when a saw blade reaches an uppermost point c from a foremost point is set to 0.8 mm.

2 Claims, 5 Drawing Sheets

JIGSAW

CROSS-REFERENCE TO RELATED APPLICATIONS

This application is based on and claims the benefit of priority from the prior Japanese Patent Application No. 2005-248509, filed on Aug. 29, 2005.

BACKGROUND

1. Technical Field

The present invention relates to a jigsaw in which a saw blade is caused to reciprocate in an up-and-down direction by a motor and a workpiece, such as timber, is cut while a main body is forcedly pushed forward, and more specifically, to a mechanism that reciprocates a saw blade even in the front-and-rear direction.

2. Description of Related Art

A jigsaw in which a saw blade is caused to reciprocate in an up-and-down direction by a motor and a workpiece, such as timber, is cut while a main body is forcedly pushed forward, is much used for cutting boards in housing construction using a 2×4 construction method. It is known that this jigsaw is advantageously adapted to reciprocate a saw blade not only in an up-and-down direction but also in a front-and-rear direction so as to draw an elliptical locus.

For example, four types of loci of a saw blade including Routes 1 to 4 are shown in FIG. 5 of JP-A-53-117897(Patent Document 1). Among these, Route 1 is shown in FIG. 6. The specification of Patent Document 1 describes "The contour of Route 1 provides particularly good cutting properties. Specifically, a saw blade engages a workpiece over almost the whole upstroke ranging from Point 1 to Point 11. Then, at Point 11, the saw blade moves to Point 1 through Point 12/0, and thereby the saw blade is withdrawn from cutting engagement to provide space enough to remove chips before it moves down to Point 6."

In addition, according to JP-A-53-117867, the jigsaw is expensive since it is difficult to form the cam. A formation of the cam is difficult, so that the saw blade does not smoothly change to follow an excursion thereof.

However, even in the jigsaw in which the saw blade is adapted to draw such a locus, if the force that an operator pushes the main body forward is strong, there is a case that the main body advances more than that until the saw blade reaches Point 12/0 and the saw blade does not yet separate from a surface to be cut even when it has reached Point 12/0.

While the saw blade ascends by a frictional force acting between the saw blade and the surface to be cut, the main body is pushed down, and at a moment when the saw blade reaches the uppermost point so that it may be switched to descent, the main body is opened from the push-down force, and is now strongly pushed up. This instantaneous change in the direction of force causes large vibration of the main body. Further, since prompt descent of the saw blade is hindered, the cutting speed may be lowered.

SUMMARY OF THE INVENTION

In view of the above circumstances, the present invention provides a jig saw which overcomes the above disadvantages.

According to an aspect of the invention, a jigsaw can work with little vibration and excellent cutting performance.

According to another aspect of the invention, there is provided a jigsaw comprising: a motor; an outer frame accommodating the motor; a base provided below the outer frame; a rotating section rotationally driven by the motor, the rotating section comprising; a rotary shaft extending in a front and back direction; a gear provided on the rotary shaft; a pin provided in an eccentric position of the gear; and a cam provided on the rotary shaft; a plunger to which a saw blade having saw teeth is attached so as to intersect the base, the plunger engaging with the pin and reciprocating in an up-and-down direction according to an up-and-down motion of the pin; and an intermediate member abutting on an outer peripheral surface of the cam and reciprocating in the up-and-down direction along the outer peripheral surface of the cam; and a roller holder capable of swinging in the outer frame; the roller holder capable of abutting on the intermediate member and the saw blade, the roller holder being configured to move a tool at a tip thereof forward when the intermediate member moves downward, and the roller holder being configured to move the tool at the tip thereof when the intermediate member moves upward. The outer peripheral surface of the cam has such a shape that an apex, a first region, and a second region are formed. The apex has a greatest distance from a rotational axis of the rotating section. The first region located on the side of the apex opposite to the direction of rotation has an increasing distance from the rotational axis with the rotation thereof. The second region located on the side of the apex in the direction of rotation has a decreasing distance from the rotational axis of the rotating section with the rotation thereof.

According to another aspect of the invention, there is provided a jigsaw including: a motor having a rotary shaft that extends in a front-and-rear direction; an outer frame that accommodates the motor; a base provided below the outer frame; a rotating section that is rotationally driven by the motor, and has a rotary shaft, a gear provided on the rotary shaft, a pin provided in an eccentric position of the gear, and a cam provided on the rotary shaft; a plunger that engages the pin and reciprocates in an up-and-down direction according to an up-and-down motion of the pin, and to which a saw blade having saw teeth is attached so as to intersect the base; and an intermediate member that abuts on an outer peripheral surface of the cam, and reciprocates in the up-and-down direction along the outer peripheral surface of the cam; and a roller holder that is rockably provided in the outer frame, and is adapted to abut on the intermediate member and the saw blade, move a tool at a tip thereof forward when the intermediate member moves downward, and move the tool at the tip thereof when the intermediate member moves upward. Here, the outer peripheral surface of the cam has an apex having a greatest distance from a rotational axis of the rotating section, a first region located on the side of the apex opposite to the direction of rotation and having an increasing distance from the rotational axis with the rotation thereof, and a second region located on the side of the apex in the direction of rotation and having a decreasing distance from the rotational axis of the rotating section with the rotation thereof. The apex is disposed in a position where the phase thereof advances by 15 degrees or more and 55 degrees or less in the direction of rotation from a position symmetrical to a center of the pin with respect to the rotational axis. The rate of change in the distance between the second region and the rotational axis is set to be greater than the rate of change in the distance between the first region and the rotational axis. A retreat amount when the saw blade reaches an uppermost point from a foremost point is set to be 0.8 mm or more at a lower end of the saw blade.

According to the above aspects, the saw blade can swing to follow such an excursion that a cutting speed is improved by the cam which can be easily formed. Accordingly, the inexpensive jigsaw having high cutting performance can be provided.

According to the above-aspects, the outer surface of the cam can be smoothly formed so that an oscillation due to the jigsaw can be decreased.

Since the apex is disposed in a position where the phase thereof advances by 15 degrees or more and 55 degrees or less in the direction of rotation from a position symmetrical to a center of the pin with respect to the rotational axis, the saw blade begins to retreat just before it reaches the uppermost point.

Since the rate of change in the distance between the second region and the rotational axis is set to be greater than the rate of change in the distance between the first region and the rotational axis, the saw blade rapidly retreat from a surface to be cut.

Moreover, since a retreat amount when the saw blade reaches an uppermost point from a foremost point is set to be 0.8 mm or more at a lower end of the saw blade, even when an operator carries out an operation while he/she strongly pushes the main body forward, the saw blade can be separated from a surface to be cut immediately after sewing.

Therefore, even when an operator carries out an operation while he/she strongly pushes the main body forward, the saw blade is already separated from a surface to be cut at a point of time when it reaches the uppermost point, and the vibration to be generated in the main body will be diminished. Further, chips are easily discharged, wasteful friction between the saw blade and a surface to be cut disappears, and cutting performance improves further.

Accordingly, it is possible to provide a jigsaw with little vibration and excellent cutting performance.

DESCRIPTION OF THE EMBODIMENTS

A jigsaw according to an embodiment of the invention will be described referring to FIGS. 1 to 8. In the description, the right side of FIG. 1 is defined as the front side of the jigsaw 1, the left side of FIG. 1 is defined as the rear side of the jigsaw 1, the upper side of FIG. 1 is defined as the upper side of the jigsaw 1, and the lower side of FIG. 1 is defined as the lower side of the jigsaw 1.

Figure 1:
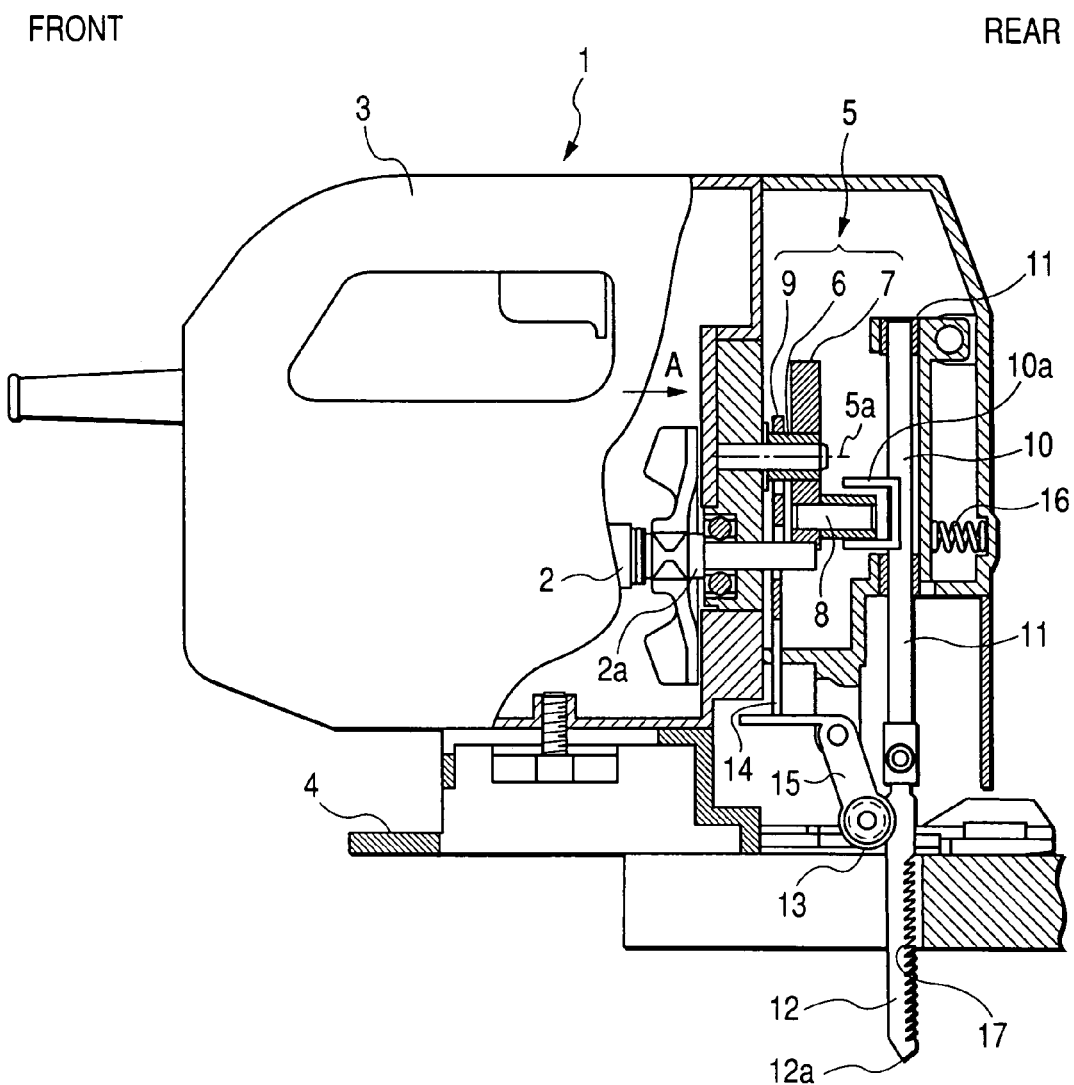
FIG. 1 is a sectional view of the overall structure of a jigsaw according to an embodiment of the invention.

As shown in FIG. 1, the jigsaw 1 includes a motor 2 having a rotary shaft 2a that extends in the front-and-rear direction, a housing 3 as an external frame that accommodates the motor 2, and a base 4 provided below the housing 3.

A rotating section 5 that meshes with a pinion formed at a tip of the rotary shaft 2a so as to be driven rotationally is provided within the housing 3. The rotating section 5 includes a spindle 6 that is a rotary shaft, a gear 7 provided on the spindle 6, a pin 8 provided in an eccentric position of the gear 7, and a cam 9 provided on the spindle 6.

A plunger 10 is provided in front of the rotating section 10. The plunger 10 is composed of a plate-shaped member extending in an up-and-down direction, and a pin-engaging part 10a that engages the pin 8 is provided in the middle of the plunger so that it moves up and down by the rotation of the pin 8. A saw blade 12 having saw teeth at the front thereof is attached to a lower end of the plunger 10 so as to intersect the base 4. Therefore, when the rotating section 5 rotates, the pin 8 makes an eccentric motion, and the plunger 10 and the saw blade 12 move up and down.

The plunger 10 is supported by a plunger holder 11 so as to be movable up and down, and the plunger holder 11 is supported by the housing 3 so as to be rockable in the front-and-rear direction, and is pressed rearward by a spring 16 provided between the plunger 11 and the housing 3. Therefore, the saw blade 12 is pressed against a roller 13 to be described, which is provided behind the saw blade.

The cam 9 is substantially disc-shaped, but as will be described later, an outer peripheral surface of the cam is formed such that the distance from a rotational axis 5a of the rotating section 5 varies with the rotation thereof. An intermediate member 14 that is supported by the housing 3 so as to be movable up and down abuts on the outer peripheral surface of the cam 9. Also, a roller holder 15 that is supported by the housing 3 so as to be rockable in the front-and-rear direction is provided below the intermediate member 14. The roller holder 15 is substantially L-shaped, and has one end that abuts on the intermediate member 14 and the other end that rotatably supports the roller 13. Therefore, when the rotating section 5 rotates, the intermediate member 14 moves up and down according to the shape of the outer peripheral surface of the cam 9, the roller holder 15 rotates, and the roller 13 moves the saw blade 12 back and forth.

Figure 2:
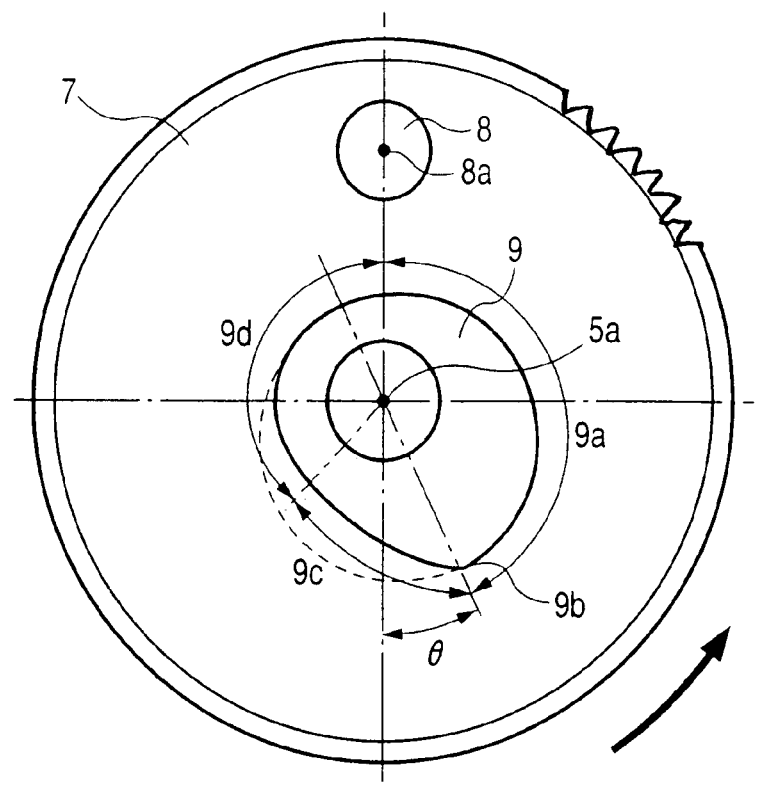
FIG. 2 shows the external appearance of the cam and the gear when viewed from the direction A in FIG. 1.

FIG. 2 shows that the cam 9 and the gear 7 are viewed from the direction A in FIG. 1. A thick arrow drawn on the lower right of FIG. 2 indicates the direction of rotation of the cam 9 and the gear 7. An apex 9b having the greatest distance from the rotational axis 5a is formed at the outer peripheral surface of the cam 9. A first region 9a whose distance from the rotational axis 5a increases with the rotation thereof is formed on the side of the apex 9b opposite to the direction of rotation, and a second region 9c whose distance from the rotational axis 5a decreases with the rotation thereof is formed on the side of the apex 9b in the direction of rotation. A third region 9d is formed on the side of the second region 9c in the direction of rotation, and the distance of the third region from the rotational axis 5a also decreases slightly with the rotation thereof. However, since the rate of change in the distance is significantly small compared with the second region, the third region will be described herein separately from the second region 9c.

Figure 3:
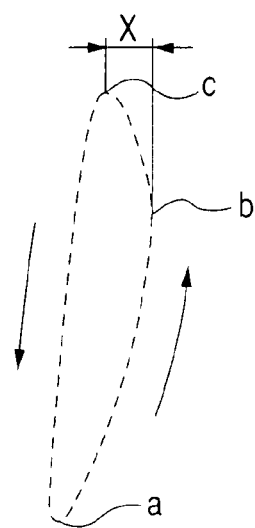
FIG. 3 is a view showing the locus of a saw blade in the jigsaw of FIG. 1.

By the configuration as described above, the lower end 12a of the saw blade 12 will move to trace a locus shown in FIG. 3 in the order of a lowermost point a, a foremost point b, and an uppermost point c. In addition, loci of the saw blade 12 shown in FIGS. 3 to 8 are more elongated in the longitudinal direction in actuality, but the loci are drawn such that they are extended laterally in order to facilitate the visualization thereof. Referring to FIGS. 2 and 3, the shape of the cam 9 will be described in more detail.

In order that the saw blade 12 may begin to retreat from just before it reaches the uppermost point c, the apex 9b is disposed in a position where the phase θ thereof becomes not less than 15 degrees and not more than 55 degrees in the direction of rotation from a position symmetrical to a center 8a of the pin 8 with respect to the rotational axis 5a. As will be described later, the invention is configured such that the retreat amount X of the saw blade 12 until it reaches the uppermost point c from the foremost point increases. This is because, if θ is smaller than 15 degrees, it is difficult to ensure a large retreat amount X, whereas if θ is greater than 55 degrees, the effective stroke in sewing becomes is insufficient and thus the cutting performance will degrade.

Further, in order that the saw blade 12 may retreat rapidly from a surface 17 to be cut, the rate of change in the distance between the second region 9c and the rotational axis 5a is set to be greater than the rate of change in the distance between the first region 9a and the rotational axis 5a. Here, the rate of change in the distance with respect to the rotational axis means the amount of change in the distance with respect to the rotational axis 5a when the cam 8 has rotated by a prescribed angle.

Moreover, if the saw blade 12 is apart from the surface 17 to be cut at a point of time when it has reached the uppermost point c, an instantaneous change in the force to be applied to a main body is mitigated. If the retreat amount until the saw blade 12 reaches the uppermost point c from the foremost point b is defined as X, the larger this retreat amount becomes, the earlier the saw blade 12 is bound to separate from the surface 17 to be cut. Although there is conventionaly a jigsaw whose retreat amount X is set to about 0.3 mm, there is no jigsaw whose retreat amount is set to be greater than that. Thus, when an experiment is carried out with the retreat amount X being set to 0.9 mm, it can be understood that the vibration when cutting operation is carried out while the jigsaw 1 is strongly pushed forward, is significantly smaller than that in related art. It is considered from this result that, even when the retreat amount X is about 0.6 mm, the vibration becomes smaller than that in related art, and when the retreat amount is about 0.8 mm. the vibration becomes less significantly. In addition, in the experiment, Japanese larch having a thickness of 36 mm that are much used in the 2×4 construction method, the normal pushing force is set to about 2.0 kgf, and the strong pushing force is set to about 4.0 kgf.

FIGS. 4 to 8 show the operation of the base 4 and the saw blade 12 sequentially when cutting operation is carried out using the jigsaw 1. An arrow drawn in the upper part of each figure indicates the traveling direction of the base 4, and an arrow marked on the base 4 and three vertical lines below the arrow are eye marks that are shown to be easy to recognize whether the base 4 has advanced on a workpiece to a certain degree.

Figure 4:
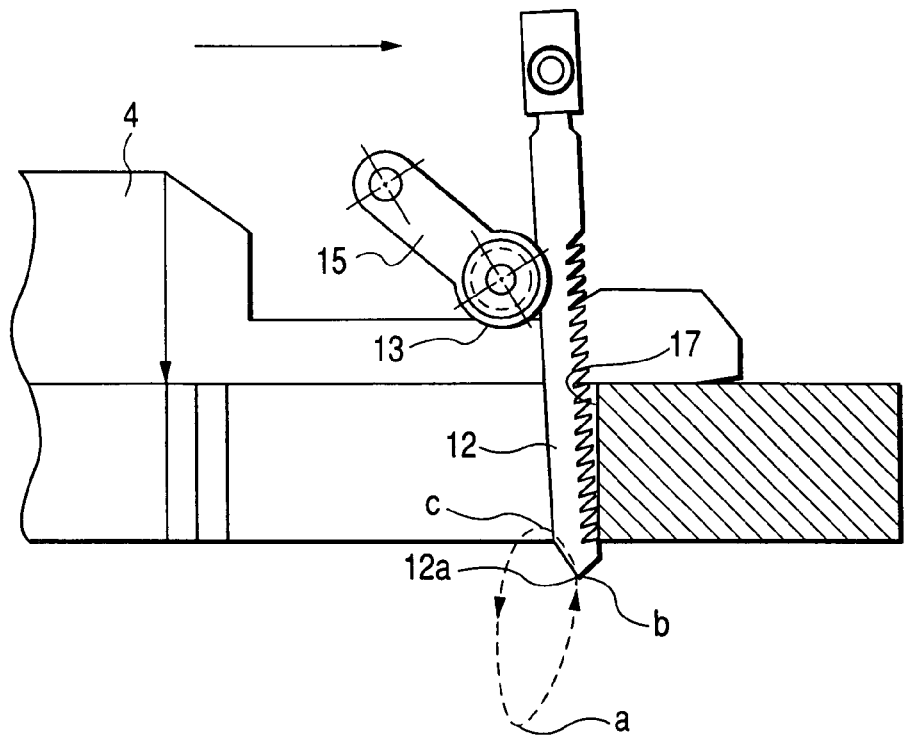
FIG. 4 is a view showing the operation of the base and the saw blade during the cutting operation of the jigsaw of FIG. 1.
Figure 5:
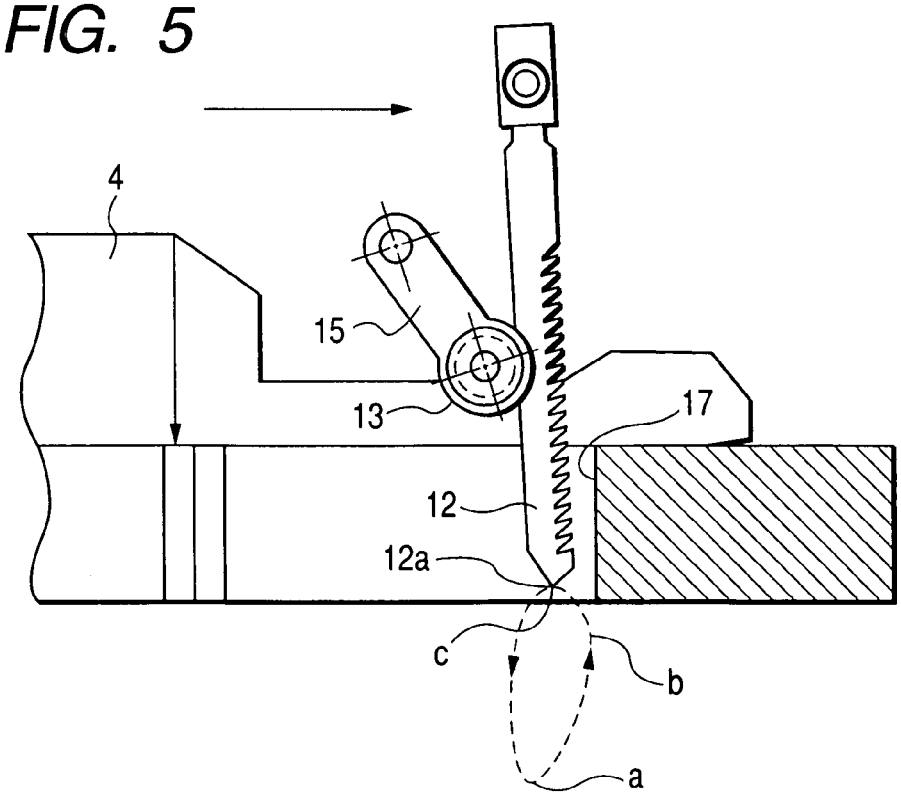
FIG. 5 is a view showing the operation of the base and the saw blade during the cutting operation of the jigsaw of FIG. 1.
Figure 6:
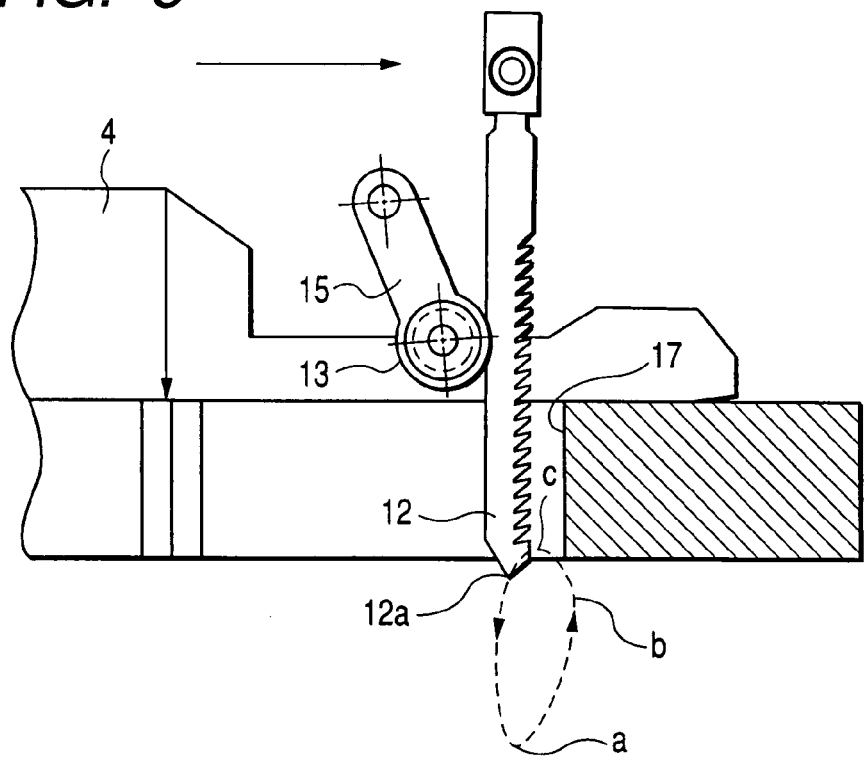
FIG. 6 is a view showing the operation of the base and the saw blade during the cutting operation of the jigsaw of FIG. 1.
Figure 7:
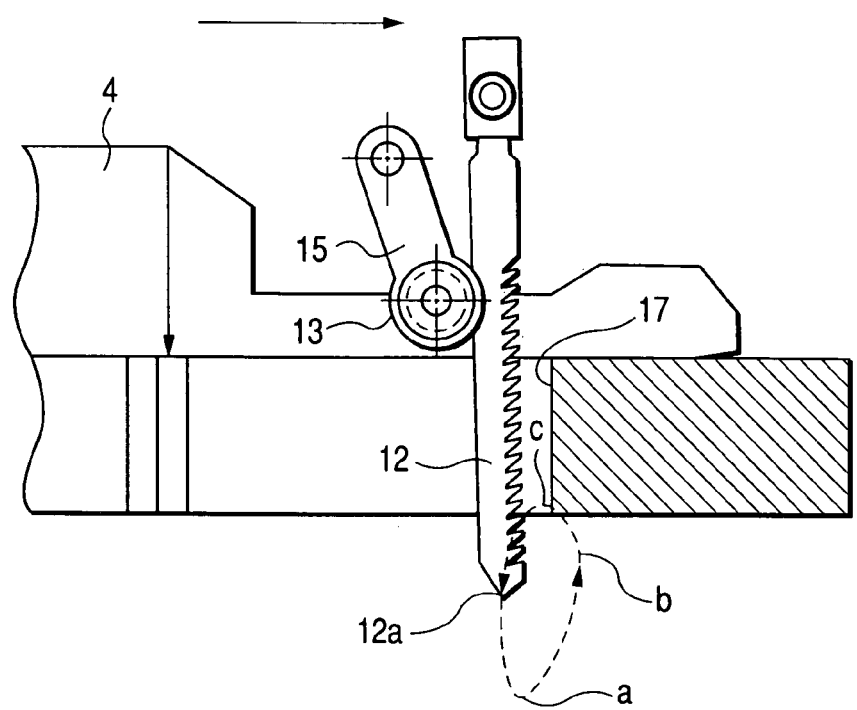
FIG. 7 is a view showing the operation of the base and the saw blade during the cutting operation of the jigsaw of FIG. 1.
Figure 8:
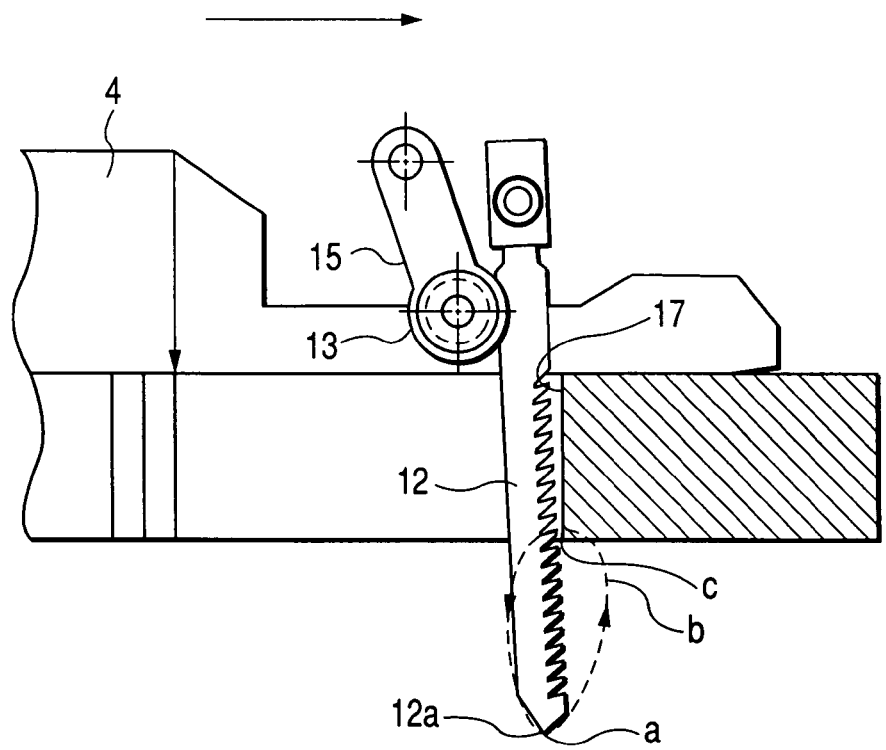
FIG. 8 is a view showing the operation of the base and the saw blade during the cutting operation of the jigsaw of FIG. 1.
Figure 9:
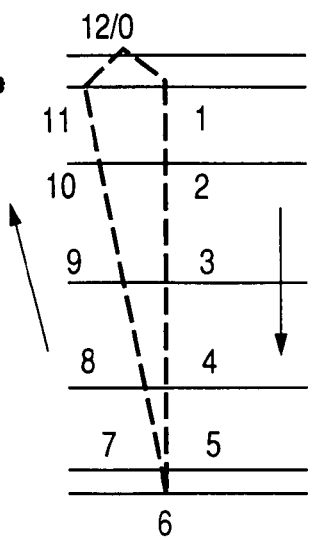
FIG. 9 is a view showing an example of the locus of a saw blade in a related art jigsaw.

FIG. 4 shows that the saw blade 12 has reached the foremost point b after the completion of sewing. The saw blade 12 begins to retreat from this point of time. Then, the saw blade reaches the uppermost point c as shown in FIG. 5, and separates from the surface 17 to be cut at the moment of switching from ascent to descent. Then, the saw blade 12 goes through the states shown in FIGS. 6 and 7, and then reaches the lowermost point a as shown in FIG. 8. From this point, the saw blade 12 switches from descent to ascent. Thereafter, the above steps are repeated.

As described above, even when an operator carries out an operation while he/she strongly pushes the main body forward, an instantaneous change in the force to be applied to the main body is mitigated, and the vibration is diminished. Further, chips are easily discharged, wasteful friction between the saw blade 12 and the surface 17 to be cut disappears, and cutting performance improves further. Accordingly, it is possible to provide a jigsaw with little vibration and excellent cutting performance.

What is claimed is:

1. A jigsaw comprising:
   a motor;
   an outer frame accommodating the motor;
   a base provided below the outer frame;
   a rotating section rotationally driven by the motor, the rotating section comprising; a rotary shaft extending in a front and back direction;
   a gear provided on the rotary shaft; a pin provided in an eccentric position of the gear;
   a cam provided on the rotary shaft;
   a plunger to which a saw blade having saw teeth is attached so as to intersect the base, the plunger engaging with the pin and reciprocating in an up-and-down direction according to an up-and-down motion of the pin;
   an intermediate member abutting on an outer peripheral surface of the cam and reciprocating in the up-and-down direction along the outer peripheral surface of the cam;
   a roller holder capable of swinging in the outer frame; the roller holder capable of abutting on the intermediate member and the saw blade, the roller holder being configured to move a tool at a tip thereof forward when the intermediate member moves downward, and the roller holder being configured to move the tool at the tip thereof when the intermediate member moves upward,
   wherein the outer peripheral surface of the cam has such a shape that an apex, a first region, and a second region are formed,
   wherein the apex has a greatest distance from a rotational axis of the rotating section,
   wherein the first region located on the side of the apex opposite to the direction of rotation of the cam has an increasing distance from the rotational axis with the rotation thereof, and
   wherein the second region located on the side of the apex in the direction of rotation has a decreasing distance from the rotational axis of the rotating section with the rotation thereof.

2. The jigsaw according to claim 1, wherein the apex is disposed in a position where the phase thereof advances by 15 degrees or more and 55 degrees or less in the direction of rotation from a position symmetrical to a center of the pin with respect to the rotational axis,
   wherein the rate of change in the distance between the second region and the rotational axis is set to be greater than the rate of change in the distance between the first region and the rotational axis, and
   wherein a retreat amount when the saw blade reaches an uppermost point from a foremost point is set to be 0.8 mm or more at a lower end of the saw blade.

* * * * *